United States Patent
Hotta et al.

[11] Patent Number: 6,007,448
[45] Date of Patent: Dec. 28, 1999

[54] LUBRICATION STRUCTURE FOR PLANETARY GEAR ASSEMBLY

[75] Inventors: Takashi Hotta; Takamichi Shimada, both of Utsunomiya, Japan

[73] Assignee: Honda Giken Kogyo Kabushiki Kaisha, Tokyo, Japan

[21] Appl. No.: 09/135,011

[22] Filed: Aug. 17, 1998

[30] Foreign Application Priority Data

Aug. 28, 1997 [JP] Japan .................................. 9-233019

[51] Int. Cl.⁶ ................................................. F16H 57/04
[52] U.S. Cl. ........................... 475/159; 74/467; 184/6.12
[58] Field of Search ................................. 475/159, 160; 74/467, 468; 184/6.12, 13.1

[56] References Cited

U.S. PATENT DOCUMENTS

| | | | |
|---|---|---|---|
| 4,453,430 | 6/1984 | Sell | 475/116 |
| 4,677,873 | 7/1987 | Eastman et al. | 475/204 |
| 4,950,213 | 8/1990 | Morisawa | 475/160 X |
| 5,230,664 | 7/1993 | Michioka et al. | 475/159 X |
| 5,302,160 | 4/1994 | Fujioka | 475/348 |
| 5,328,419 | 7/1994 | Motl et al. | 475/234 |
| 5,480,361 | 1/1996 | Murakami et al. | 475/328 |
| 5,527,229 | 6/1996 | Ishihara et al. | 475/249 |
| 5,593,016 | 1/1997 | Murata et al. | 192/85 AA |
| 5,634,530 | 6/1997 | Maekawa et al. | 74/467 X |
| 5,690,579 | 11/1997 | Takeda et al. | 475/281 |
| 5,800,298 | 9/1998 | Kanehara et al. | 474/8 |
| 5,879,260 | 3/1999 | Yoshida et al. | 475/214 |

*Primary Examiner*—Charles A Marmor
*Assistant Examiner*—Scott Lund
*Attorney, Agent, or Firm*—Armstrong, Westerman, Hattori, McLeland and Naughton

[57] ABSTRACT

An oil sump 44 and a second oil supply passage 45, which are to lead lubrication oil from a first oil supply passage 43 to where lubrication is needed, i.e., to gears and a clutch, are formed in a sun gear 21, which has a sufficient strength as a torque transmission member. In comparison with another case where an oil sump and an oil supply passage are provided in a relatively thin member such as a sleeve 3, the unfavorable effect of stress concentration around the oiling aperture and of deterioration of strength from the reduced thickness can be greatly minimized. In addition, the fabrication of the oil sump and the oil supply passage is much easier and cost-effective than if they were to be provided in a thinner member.

5 Claims, 4 Drawing Sheets

LUBRICATION STRUCTURE FOR PLANETARY GEAR ASSEMBLY

RELATED APPLICATIONS

This application claims the priority of Japanese Patent Application No. 9-233019 filed on Aug. 28, 1997, which is incorporated herein by reference.

FIELD OF THE INVENTION

The present invention relates to a lubrication structure, i.e., a structural arrangement for supplying lubrication oil, for a planetary gear assembly, and particularly to a lubrication structure designed for lubricating the gears, clutches, etc. of a planetary gear assembly with oil which is passed through an oil supply passage provided in the input shaft of the assembly.

BACKGROUND OF THE INVENTION

A planetary gear assembly comprises planetary gear trains, each of which includes a sun gear, a pinion, a carrier, and a ring gear. In addition to these rotational components, the assembly further includes clutches and brakes to control the rotations of the components in predetermined manners. Each clutch engages a specific rotational component with another component, and each brake holds a specific rotational component stationary with respect to the housing of the transmission (transmission casing). In this planetary gear assembly, when a clutch or a brake is being brought into engagement, frictional heat is generated in the friction discs that constitute the respective engaging elements. For this reason, lubrication oil must be supplied not only to the gears but also to the clutches and brakes.

For the lubrication of components of a transmission such as gears, it is commonly practiced that an oil supply passage is formed in the input shaft of the transmission while the openings or outlets are drilled radially in communication with the supply passage to lead the oil for lubrication. However, since it is typical that the input shaft is mounted or covered with cylindrical members, such as sleeves, these cylindrical members must also have oiling apertures to deliver the oil further outward. Therefore, additional oiling apertures are provided in the cylindrical members, in alignment with the outlets of the oil supply passage. In this case, generally, sumps (concave grooves) are provided at the inlets of the oiling apertures (inside the cylindrical members) so that a small amount of shift of the cylindrical members with respect to the input shaft will not affect the flow of the lubrication oil into the oiling apertures.

However, in the above method, if the cylindrical members, e.g., sleeves, are designed in thin cylinders and are provided with such oil sumps and oiling apertures, the cylindrical members may be subjected to problems of stress concentration around the oiling apertures and of deterioration of overall strength because of the reduced thickness caused by the formation of the sumps. On the other hand, if these cylindrical members are designed relatively thick to prevent such problems, then the weight and size of the planetary gear assembly may increase by a certain amount, making the miniaturization of the assembly difficult, which is an alternative problem.

SUMMARY OF THE INVENTION

The present invention is to solve the above mentioned problems. Therefore, it is an object of the present invention to provide a lubrication structure for a planetary gear assembly, which structure makes it unnecessary to provide oiling apertures in cylindrical members that are mounted on the input shaft of the assembly.

It is another object of the present invention to provide a lubrication structure that ensures a steady supply of lubrication oil, which is first led into an oil supply passage provided in the input shaft of a transmission, and then to the rotational components of the transmission, such as gears and clutches.

In order to achieve these objectives, the present invention provides the following lubrication structure for a planetary gear assembly. This lubrication structure is applied to a planetary gear assembly which is used for transmitting rotational power provided from an input shaft. The planetary gear train, which includes a clutch and a brake, is disposed on the input shaft, on which the sun gear of the gear train is mounted rotatably. The clutch is used to couple rotational components of the planetary gear train, and the brake is to fix a rotational component of the gear train stationary. In this assembly, the lubrication structure comprises a first oil supply passage which is formed inside the input shaft, extending axially; an oil sump which is formed in an internal circumference of the sun gear and a second oil supply passage which is formed inside the sun gear. The first oil supply passage has an outlet opening in an outer surface of the input shaft at a location where the sun gear is mounted, and the oil sump, which is provided inside the sun gear, accommodates the outlet opening. The second oil supply passage extends axially in the sun gear from the oil sump and opens at a lateral face of the sun gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figure 1:
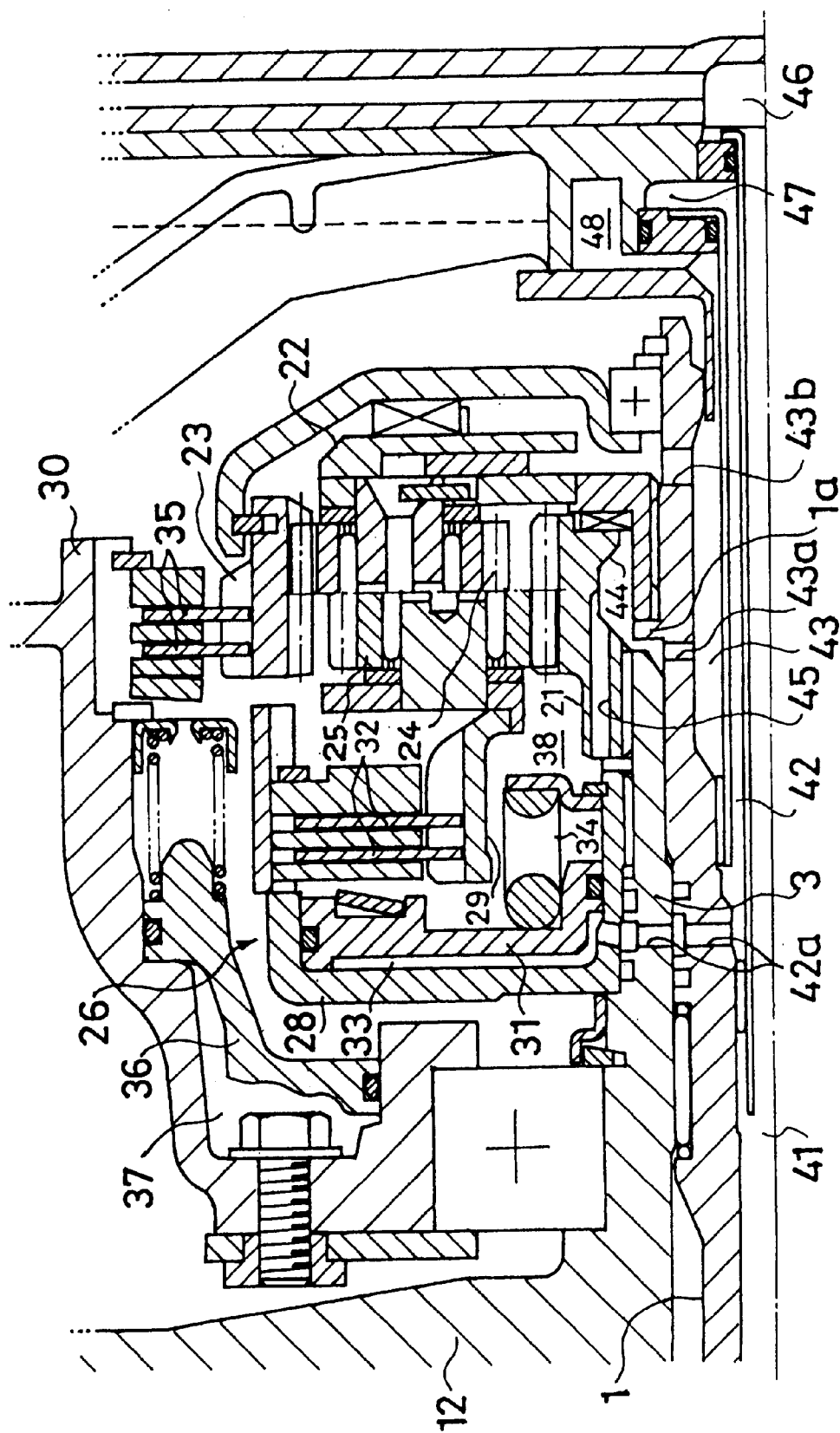
FIG. 1 is a sectional view showing a lubrication structure according to the present invention, as a first embodiment.
Figure 2:
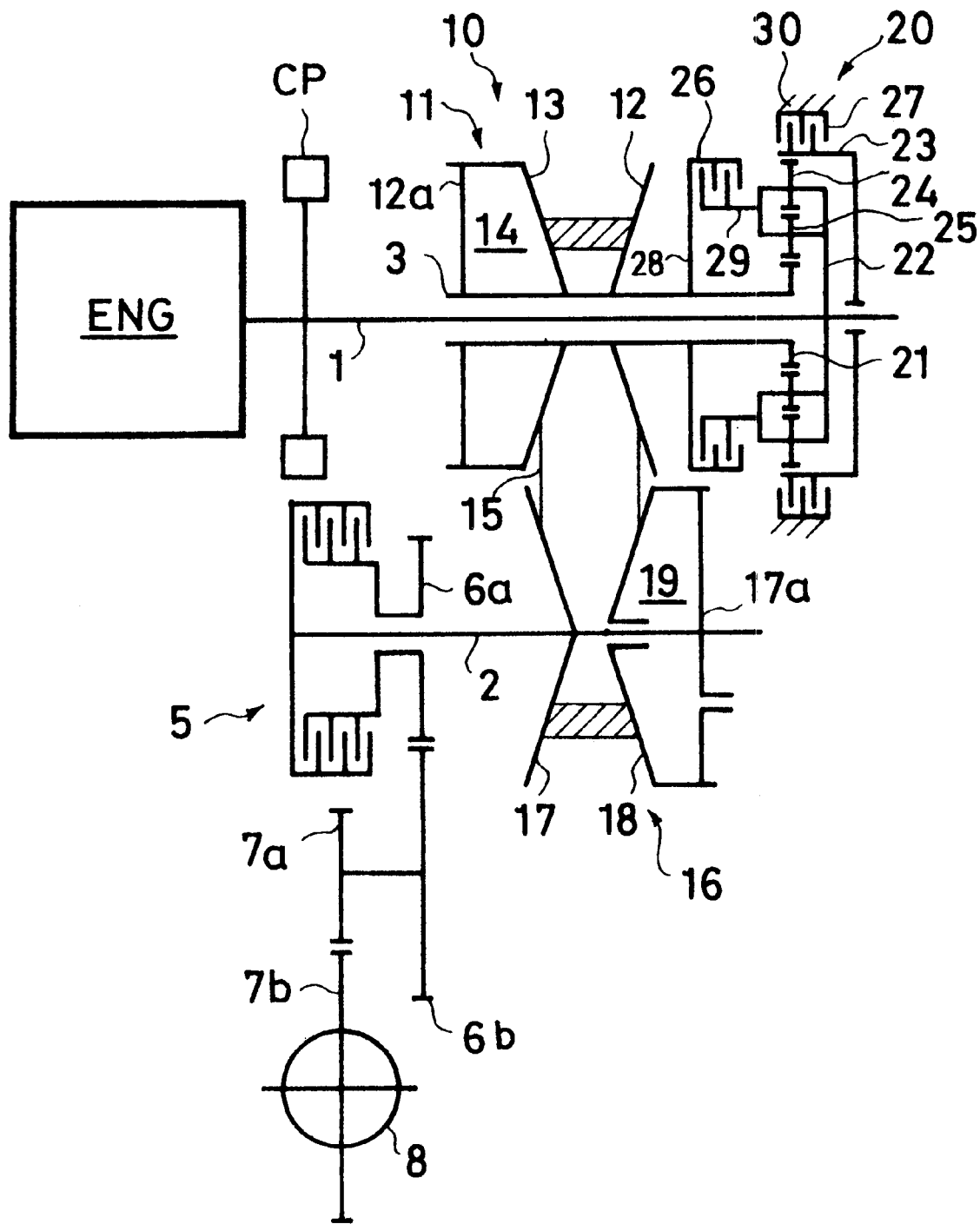
FIG. 2 is a skeleton diagram showing the power transmission routes of a belt-type continuously variable transmission, in which the lubrication structure of the first embodiment is incorporated.

Now, preferred embodiments of the present invention will be described with reference to the drawings. FIGS. 1 and 2 are for a description of a first embodiment of the present invention. FIG. 1 shows the details of the lubrication structure, and FIG. 2 shows the power transmission routes of a belt-type continuously variable transmission, in which the lubrication structure is incorporated. This belt-type continuously variable transmission CVT, which is mounted in a vehicle, comprises a metallic V-belt mechanism 10, which is disposed between an input shaft 1 and a countershaft 2; a planetary gear forward-reverse selector mechanism 20, which is disposed between the input shaft 1 and a drive pulley 11; and a main clutch 5, which is disposed between the countershaft 2 and an output member (differential mechanism 8, etc). The input shaft 1 of the transmission is coupled to the output shaft of the engine ENG through a coupling mechanism CP, and the power transmitted from the transmission to the differential mechanism 8 is then transmitted to the right and left wheels.

The metallic V-belt mechanism 10 comprises a drive pulley 11, which is mounted on the input shaft 1; a driven pulley 16, which is mounted on the countershaft 2; and a metallic V-belt 15, which is wound around the drive and driven pulleys 11 and 16.

The drive pulley 11 comprises a fixed pulley member 12 and a movable pulley member 13. The fixed pulley member 12 is fixed on a sleeve 3 which is in turn rotatably mounted on the input shaft 1, and the movable pulley member 13 is axially slidable over the sleeve 3 with respect to the fixed pulley member 12. The movable pulley member 13 has a cylinder chamber 14 which is defined axially laterally therein by a cylinder wall 12a that is fixed on the sleeve 3, which is coupled to the fixed pulley member 12 as mentioned previously. An oil supply passage 41 is provided inside the input shaft 1 with an inlet 46, and the hydraulic pressure that is created by the oil supplied through the oil supply passage 41 into the cylinder chamber 14 generates a lateral thrust that slides the movable pulley member 13 axially toward the fixed pulley member 12.

The driven pulley 16 comprises a fixed pulley member 17 fixed on the countershaft 2, and a movable pulley member 18 axially slidable with respect to the fixed pulley member 17. The movable pulley member 18 has a cylinder chamber 19 which is defined axially laterally therein by a cylinder wall 17a that is coupled to the fixed pulley member 17. The hydraulic pressure supplied into the cylinder chamber 19 generates a lateral thrust which slides the movable pulley member 18 axially toward the fixed pulley member 17.

By controlling the pressures supplied into the cylinder chambers 14 and 19, the thrusts of the movable members are adjusted to vary the widths of the pulleys 11 and 16 appropriately while avoiding slippage of the V-belt 15. As a result, the pitch diameters of the pulleys 11 and 16, at which the V-belt 15 is in contact, are continuously variable, thus making the speed ratio of the transmission continuously variable.

The planetary gear forward-reverse selector mechanism 20 comprises a double pinion type planetary gear train. The sun gear 21 is coaxially and rotatably mounted over the input shaft 1, and is coupled to the clutch outer 28 which constitutes a forward clutch 26. This clutch outer 28 is, in turn, fixed to the rear end of the sleeve 3. The carrier 22, which retains an outer pinion 24 and an inner pinion 25 rotatably, is coupled to the input shaft 1 and to the clutch inner 29 which constitutes the forward clutch 26. The ring gear 23 is coaxially and rotatably mounted over the input shaft 1, and is fixable to the transmission casing by a reverse brake 27. The outer pinion 24 and the inner pinion 25 intermesh while the outer pinion 24 meshes with the ring gear 23, and the inner pinion 25 with the sun gear 21.

As the fixed pulley member 12 is fixed to the sleeve 3, which is fixed to the forward clutch 26, when the forward clutch 26 is engaged, all the gears 21, 22 and 23 of the planetary gear train rotate at the same rotational speed as the input shaft 1, and the drive pulley 11 is driven in the same rotational direction as the input shaft 1 (forward drive direction). On the other hand, when the reverse brake 27 is engaged, the ring gear 23 is held stationary, so the sun gear 21 rotates in the direction opposite to that of the carrier 22, which rotates in union with the input shaft 1. As a result, the drive pulley 11 is driven in the direction opposite to that of the input shaft 1 (reverse drive direction).

The main clutch 5 controls the transmission of the power from the countershaft 2 to the output member. When the main clutch 5 is engaged, the power is transmitted from the countershaft 2 to the output member. As the engaging force thereof is also controlled, the size of the torque transmitted from the countershaft 2 to the output member is controlled (torque capacity). When the main clutch 5 is engaged, the power from the engine is transmitted from the countershaft 2 through meshing gears 6a, 6b, 7a and 7b to the differential mechanism 8 at a speed ratio determined by the metallic V-belt mechanism 10, and the power is then divided and transmitted further to the right and left wheels (not shown in the figure). When the main clutch 5 is disengaged (torque capacity is zero), the transmission is in the neutral condition, and the power from the engine is not transmitted at all.

In the forward drive range, the forward clutch 26 is fully engaged while the reverse brake 27 is fully disengaged. By the engagement of the forward clutch 26, the sun gear 21 and the carrier 22 are coupled together. As a result, the whole of the planetary gear train, which constitutes the planetary gear forward-reverse selector mechanism 20, rotates together in union. In this condition, if the main clutch 5 is engaged, the vehicle will travel forward.

In the reverse drive range, the forward clutch 26 is fully disengaged, and the main clutch 5 is fully engaged. In this condition, when the reverse brake 27 is engaged, the vehicle will travel rearward.

As shown in FIG. 1, the forward clutch 26 comprises a plurality of friction discs 32, which are provided between the clutch outer 28 and the clutch inner 29; a clutch piston 31, which is provided in the clutch outer 28 and is capable of pressing the friction discs 32; and a spring 34, which pushes back the clutch piston 31. On the other hand, the reverse brake 27 comprises a plurality of friction discs 35, which are provided between the ring gear 23 and the casing 30, surrounding the ring gear 23; and a brake piston 36, which is retained slidably in the casing 30 and is capable of pressing the friction discs 35.

In the forward clutch 26, an oil chamber 33 is provided between the clutch outer 28 and the clutch piston 31, and hydraulic oil is supplied thereinto from an inlet 47 through an oil supply passage 42, which is provided in the input shaft 1, and through outlets 42a. By the hydraulic oil being supplied, the clutch piston 31 is driven rightward pressing the friction discs 32 such that the friction discs 32 adhere to one another, thus engaging the clutch outer 28 with the clutch inner 29. In the same manner, by the hydraulic oil being supplied into the oil chamber 37 which is located between the brake piston 36 and the casing 30, the brake piston 36 is driven right ward pressing the friction discs 35 such that the friction discs 35 adhere to one another, thus engaging the ring gear 23 with the casing 30.

In the vicinity of the rear end of the sleeve 3, openings 43a are provided in the input shaft 1 as outlets for lubrication oil. Lubrication oil is supplied from an inlet 48 through an oil supply passage 43 (equivalent to the first oil supply passage which will be mentioned in claims) which is provided in the input shaft 1. In addition, the sun gear 21 is provided with an oil sump 44, which extends as a groove along the internal circumference of the sun gear 21, to accommodate the outlets 43a. Furthermore, the sun gear 21 is provided with an oil supply passage 45 (equivalent to the second oil supply passage which will be mentioned in claims). This oil supply passage extends axially inside the sun gear 21 from the oil sump 44 and opens at a lateral face of the sun gear 21.

In this structure, the lubrication oil coming from the oil supply passage 43 through the outlet 43a passes through a clearance which exists between the rear end of the sleeve 3 and a ring-like protrusion 1a provided on the input shaft 1, then into the oil sump 44 in the sun gear 21. While being reserved therein, the lubrication oil spouts into a space 38 between the sun gear 21 and the clutch inner 29 and lubricates some of the components of the transmission such as gears and the forward clutch.

In this structure, the oil sump 44 and the oil supply passage 45, which lead the lubrication oil from the oil supply passage 43 to the place where lubrication is needed, are provided in the sun gear 21. Since the sun gear 21 is a torque-transmission member, it is designed and fabricated to have sufficient strength. In comparison with a case where an oil sump and an oil supply passage were provided in relatively thin members such as the sleeve 3 and the clutch outer 28, the unfavorable effect of stress concentration around the oiling apertures and of deterioration of strength from the reduced thickness can be greatly minimized. In addition, the fabrication of the oil sump and the oil supply passage is much easier and cost-effective than if they were to be provided in the thinner members.

Figure 3:
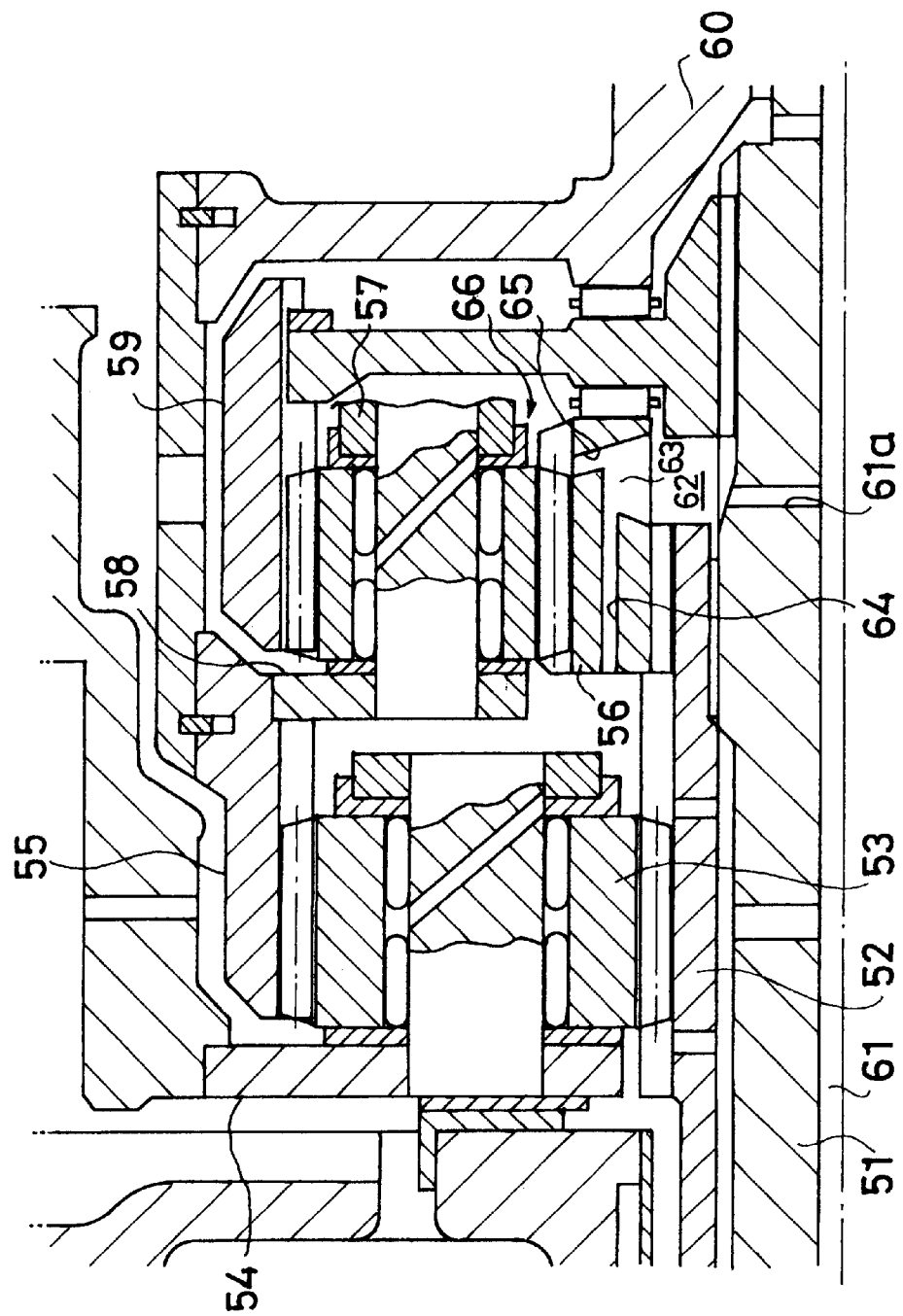
FIG. 3 is a sectional view showing a lubrication structure according to the present invention, as a second embodiment.

Now, with reference to FIG. 3, a second embodiment according to the present invention is described. FIG. 3 shows a lubrication structure that is incorporated in a transmission which can be used in a vehicle. This transmission comprises two planetary gear trains, which are mounted one in front of the other on an input shaft 51. The front sun gear 52 and the rear sun gear 56 are combined together and are rotatable in union around the input shaft 51. The rear ring gear 59, which meshes with the rear pinions 57, is fixed to the input shaft 51. The rear carrier 58, which supports the rear pinions pivotally, is coupled to the front ring gear 55, which meshes with the front pinions 53, and to an output shaft 60. Furthermore, the front carrier 54, which supports the front pinions 53 pivotally, is engageable to a one-way clutch and a brake (both are not shown).

In the vicinity of the rear end of the front sun gear 52, openings 61a are provided in the input shaft 51 as outlets for lubrication oil which is supplied through an oil supply passage 61 (equivalent to the first oil supply passage which will be mentioned in claims). Also, an oil sump 63 is provided extending as a groove in the internal circumference of the rear sun gear 56, to accommodate these outlets 61a. Furthermore, the rear sun gear 56 is also provided with an oil supply passage 64 (equivalent to the second oil supply passage which will be mentioned in claims), which extends axially inside the rear sun gear 56 from the oil sump 63 and opens at a lateral face of the rear sun gear 56. In addition, the rear sun gear 56 is provided with another oil supply passage 65, which extends radially outward from the oil sump 63. In this case, the rear sun gear 56 is formed with a little extra axial width extending beyond the gear face width that meshes with the rear pinions 57, and the oil supply passage 65 is provided where the rear sun gear 56 and the rear pinions 57 do not mesh with each other.

In this structure, the lubrication oil coming from the oil supply passage 61 through the outlet 61a passes through a clearance 62 that exists between the rear end of the front sun gear 52 and the hub of the rear ring gear 59 over the input shaft 51, and flows into the oil sump 63. While being reserved therein, the lubrication oil passes through the oil supply passages 64 and 65, thus spouting out of the rear sun gear 56 to lubricate some of the components of the transmission such as gears. In this way, the lubrication structure of this embodiment is as effective as the first embodiment. The second embodiment is especially effective for a multi-speed range transmission in which the rotational speeds of the pinions, which mesh with the rear sun gear 56, experience an extremely high speed in the planetary gear train.

Figure 4:
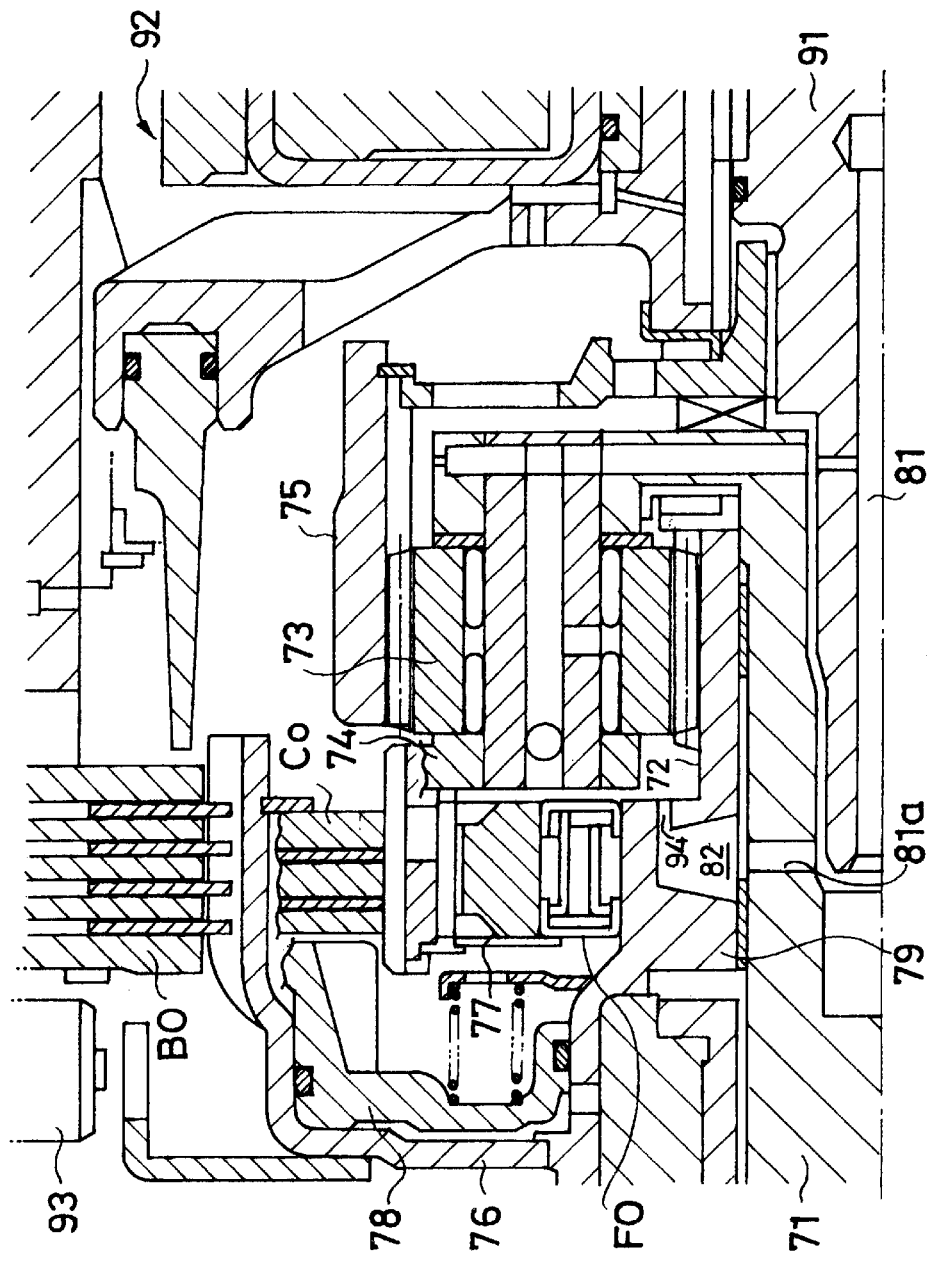
FIG. 4 is a sectional view showing a lubrication structure according to the present invention, as a third embodiment.

Now, with reference to FIG. 4, a third embodiment according to the present invention is described. FIG. 4 shows a lubrication structure that is incorporated in an overdrive mechanism (OD mechanism). The OD mechanism is located in front of the main transmission 92, and it transmits the output of the engine (not shown) to the input shaft 91 of the main transmission 92 without any speed change if the vehicle is not in overdrive mode. However, if the vehicle is in overdrive mode, then the OD mechanism increases the rotational speed, which is then transmitted to the input shaft 91. The OD sun gear 72, which meshes with the OD pinions 73, is provided rotatably on the OD input shaft 71, and the OD carrier 74, which supports the OD pinions 73 pivotally, is fixed to the OD input shaft 71.

The OD ring gear 75, which meshes with the OD pinions 73, is supported rotatably on the input shaft 71 and coupled directly to the input shaft 91 of the main transmission 92. In addition, the OD sun gear 72 is connected to the OD clutch outer 76 while the OD carrier 74 is connected to the OD clutch inner 77. In turn, the OD clutch inner 77 is engageable to the OD sun gear 72 and to the OD clutch outer 76 through an OD one-way clutch FO, and the OD clutch Co is provided between the OD clutch outer 76 and the OD clutch inner 77. When the OD clutch Co is pressed by an OD clutch piston 78, the OD clutch outer 76 and the OD clutch inner 77 are engaged. Moreover, an OD brake is provided between the clutch outer 76 and the casing 93.

In the vicinity of the hub 79 of the OD sun gear, openings 81a are provided in the OD input shaft 71 as outlets for lubrication oil which is supplied through an oil supply passage 81 (equivalent to the first oil supply passage which will be mentioned in claims). Also, an oil sump 82, which extends as a groove in the internal circumference of the hub 79 of the OD sun gear, is provided to accommodate the outlets 81a. Furthermore, the hub 79 of the OD sun gear is also provided with an oil supply passage 94 (equivalent to the second oil supply passage which will be mentioned in claims), which extends axially inside the hub from the oil sump 82 and opens at a lateral face of the rear sun gear.

In this structure, the lubrication oil from the oil supply passage 81 in the OD input shaft 71 reaches the oil sump 82 through the outlet 81a. While being reserved therein, the lubrication oil then passes through and spouts out of the oil supply passage 94 to lubricate some of the components of the OD mechanism. In this way, the lubrication structure of this embodiment is as effective as the first embodiment. The third embodiment is especially effective for lubricating both the planetary pinions 73 and the one-way clutch FO.

As described above, the lubrication structure according to the present invention lubricates effectively not only in the planetary gear assembly (planetary gear forward-reverse selector mechanism) of a continuously variable transmission CVT but also in an automatic transmission which comprises a plurality of planetary gear trains. Therefore, the present invention is not limited to the example shown in FIG. 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubrication structure for a planetary gear assembly, comprising:

a planetary gear train which is disposed on an input shaft, said planetary gear train including a sun gear which is rotatable on said input shaft;

a clutch which combines a component of said planetary gear train with another component thereof, and a brake which fixes a component of said planetary gear train stationary;

a first oil supply passage which is formed inside said input shaft, said first oil supply passage extending axially and having an outlet opening in an outer surface of said input shaft at a location where said sun gear is mounted;

an oil sump which is formed in an internal circumference of said sun gear to accommodate said outlet opening; and a second oil supply passage which is formed inside said sun gear, said second oil supply passage extending axially from said oil sump and opening at a lateral face of said sun gear, said planetary gear train further comprising a carrier and a ring gear, and said sun gear being coupled to an output member while said carrier is coupled to said input shaft; and said clutch engaging said sun gear with said carrier and said brake holding said ring gear stationary.

2. The lubrication structure as set forth in claim 1 wherein:

a member which connects said carrier with said input shaft is provided axially at one side of said gun gear while said clutch is provided axially at the other side of said sun gear; and said second oil supply passage opens to the other side of said sun gear so that lubrication oil can be supplied to said clutch.

3. The lubrication structure as set forth in claim 1 wherein:

said planetary gear train is integrated as a forward-reverse drive selector mechanism in a belt operated continuously variable transmission, said planetary gear train being disposed between an input shaft of said transmission and a belt mechanism;

the input shaft of said planetary gear train and the input shaft of said transmission are formed in a one-piece body; and said sun gear is coupled to an input member of said belt mechanism while said carrier is connected to said input member of said belt mechanism through said clutch.

4. The lubrication structure as set forth in claim 3 wherein:

said planetary gear train is a double pinion gear train.

5. The lubrication structure as set forth in claim 3 wherein said transmission employs a metallic V-belt and said belt mechanism is a metallic V-belt mechanism, and said planetary gear train is disposed between said input shaft of said transmission and said metallic V-belt mechanism.

* * * * *